(12) United States Patent
Vasseur et al.

(10) Patent No.: US 7,675,860 B2
(45) Date of Patent: Mar. 9, 2010

(54) METHOD AND APPARATUS FOR DETERMINING A PREFERRED BACKUP TUNNEL TO PROTECT POINT-TO-MULTIPOINT LABEL SWITCH PATHS

(75) Inventors: Jean Philippe Vasseur, Dunstable, MA (US); Stefano Novello, Concord, MA (US); Vassilios Liatsos, Arlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 517 days.

(21) Appl. No.: 11/363,840

(22) Filed: Feb. 27, 2006

(65) Prior Publication Data

US 2007/0201355 A1 Aug. 30, 2007

(51) Int. Cl.
 *H04J 1/16* (2006.01)
(52) U.S. Cl. .................................................... 370/237
(58) Field of Classification Search ................. 370/216, 370/217, 244, 250, 225, 229, 235, 238, 218, 370/221, 395.21, 295.32, 351–356, 237, 370/226, 227, 228, 310, 312, 431, 432; 714/100, 714/1, 2, 3, 4
 See application file for complete search history.

(56) References Cited

U.S. PATENT DOCUMENTS

| 6,850,487 | B2 * | 2/2005 | Mukherjee et al. | 370/225 |
|---|---|---|---|---|
| 6,904,018 | B2 * | 6/2005 | Lee et al. | 370/238 |
| 7,209,975 | B1 * | 4/2007 | Zang et al. | 709/238 |
| 7,280,755 | B2 * | 10/2007 | Kang et al. | 398/7 |
| 2003/0002444 | A1 * | 1/2003 | Shin et al. | 370/238 |
| 2006/0159009 | A1 * | 7/2006 | Kim et al. | 370/216 |

* cited by examiner

*Primary Examiner*—Kwang B Yao
*Assistant Examiner*—Obaidul Huq
(74) *Attorney, Agent, or Firm*—Brinks Hofer Gilson and Lione

(57) ABSTRACT

A method, apparatus and computer program product for determining a preferred backup path to protect a point-to-multipoint label switching path is presented. A point-to-multipoint backup path is computed for each node located upstream from a branching node, the backup path originating at the node and including a set of nodes downstream from said branching node. A cost metric associated with each backup path is determined, as is a distance metric associated with each backup path. From the cost and distance metrics associated with each backup path a preferred backup path is selected using a distributed algorithm.

20 Claims, 5 Drawing Sheets

METHOD AND APPARATUS FOR DETERMINING A PREFERRED BACKUP TUNNEL TO PROTECT POINT-TO-MULTIPOINT LABEL SWITCH PATHS

BACKGROUND

The Internet is a massive network of networks in which computers communicate with each other via use of different communication protocols. The Internet includes packet-routing devices, such as switches, routers and the like, interconnecting many computers. To support routing of information such as packets, each of the packet-routing devices typically maintains routing tables to perform routing decisions in which to forward traffic from a source computer, through the network, to a destination computer.

One way of forwarding information through a provider network over the Internet is based on MPLS (Multiprotocol Label Switching) techniques. In an MPLS-network, incoming packets are assigned a label by a so-called LER (Label Edge Router) receiving the incoming packets. The packets in the MPLS network are forwarded along a predefined Label Switch Path (LSP) defined in the MPLS network based, at least initially, on the label provided by a respective LER. At internal nodes of the MPLS-network, the packets are forwarded along a predefined LSP through so-called Label Switch Routers. LDP (Label Distribution Protocol) and/or RSVP-TE are used to distribute appropriate labels for label-switching purposes.

Each Label Switching Router (LSR) in an LSP between respective LERs in an MPLS-type network makes forwarding decisions based solely on a label of a corresponding packet. Depending on the circumstances, a packet may need to travel through many LSRs along a respective path between LERs of the MPLS-network. As a packet travels through a label-switching network, each LSR along an LSP strips off an existing label associated with a given packet and applies a new label to the given packet prior to forwarding to the next LSR in the LSP. The new label informs the next router in the path how to further forward the packet to a downstream node in the MPLS network eventually to a downstream LER that can properly forward the packet to a destination.

MPLS service providers have been using unicast technology to enable communication between a single sender and a single receiver in label-switching networks. The term unicast exists in contradistinction to multicast, which involves communication between a single sender and multiple receivers. Both of such communication techniques (e.g., unicast and multicast) are supported by Internet Protocol version 4 (Ipv4).

Service providers have been using so-called unicast Fast Reroute (FRR) techniques for quite some time to provide more robust unicast communications. In general, fast rerouting includes setting up a backup path established prior to the occurrence of the failure for transmitting data in the event of a network failure so that a respective user continues to receive data even though the failure occurs.

One of the key drivers for the deployment of MPLS Traffic Engineering Point to Multipoint is the ability to provide fast restoration in case of link/shared risk link group (SRLG)/ node failure for sensitive traffic such as video (particularly sensitive to traffic loss: even with forward error correction (FEC) techniques, the impact of a link or node failure on the traffic is very significant and requires local protection recovery techniques).

MPLS TE Fast Reroute can be used to protect a P2MP (Point To Multipoint) LSP in case of link, SRLG and node failure if the node is not a branching node. Conversely, if the node is a branching node (thus performing the traffic replication), the problem becomes more complex and two methods can be used. The first method used makes use of point to point (P2P) backup tunnels to protect a point-to-multipoint (P2MP) TE LSP against a branching node failure, and the second method used makes use of P2MP backup tunnels to protect a P2MP TE LSP against a branching node failure. Furthermore additional constraints such as the optimal location for restoration (the head-end of the backup, in other words the repairing node) make the problem even more difficult to solve.

SUMMARY

Conventional mechanisms such as those explained above suffer from a variety of deficiencies. One such deficiency is associated with the method which makes use of point to point (P2P) backup tunnels to protect a point-to-multipoint (P2MP) TE LSP against a branching node failure. This method is less optimal in terms of required backup capacity but potentially leads to a smaller number of backup tunnels. Another such deficiency is associated with the method which makes use of P2MP backup tunnels to protect a P2MP TE LSP against a branching node failure. While this method may be desirable in some cases (due to the more optimal use of backup capacity) it comes at the price of a potentially larger number of backup tunnels (in some cases).

In several network scenarios it may be desirable to not elect the immediately upstream protected node as the PLR so as to minimize the required backup bandwidth, provided that the increased failure detection time is bounded. Note that limited capability of the node immediately upstream to the protected element to act as a branching node may also constrain the choice of the PLR.

Embodiments of the invention significantly overcome such deficiencies and provide mechanisms and techniques that provide a method and apparatus for determining a preferred backup tunnel to protect point-to-multipoint label switch paths. A technique is used that determines the PLR that provides the lower cost P2MP backup tunnel while ensuring a bounded failure detection time. The technique provides for the dynamic election of an optimal PLR to protect primary P2MP Fast Reroutable TE LSPs while taking into account constraints such as the maximum tolerable failure detection time.

In a particular embodiment of a method of determining a preferred backup path to protect a point-to-multipoint label switching path, the method includes computing a point-to-multipoint backup path for each node located upstream from a branching node, the backup path originating at the node and including a node downstream from said branching node. The method further includes determining a cost metric associated with each backup path and determining a distance metric associated with each backup path. From the cost and distance metrics associated with each backup path a preferred backup path is selected using a distributed algorithm based on the cost metric and the distance metric.

Other embodiments include a computer readable medium having computer readable code thereon for determining a preferred backup path to protect a point-to-multipoint label switching path. The medium includes instructions for computing a point-to-multipoint backup path for each node located upstream from a branching node, the backup path originating at the node and including a node downstream from said branching node. The medium also includes instructions for determining a cost metric associated with each backup path and instructions for determining a distance metric associated with each backup path. The medium further includes instructions for selecting a preferred backup path from the collection of backup paths based on the cost metric and the distance metric.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method and apparatus for determining a preferred backup path to protect a point-to-multipoint label switching path as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method and apparatus for determining a preferred backup path to protect a point-to-multipoint label switching path as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
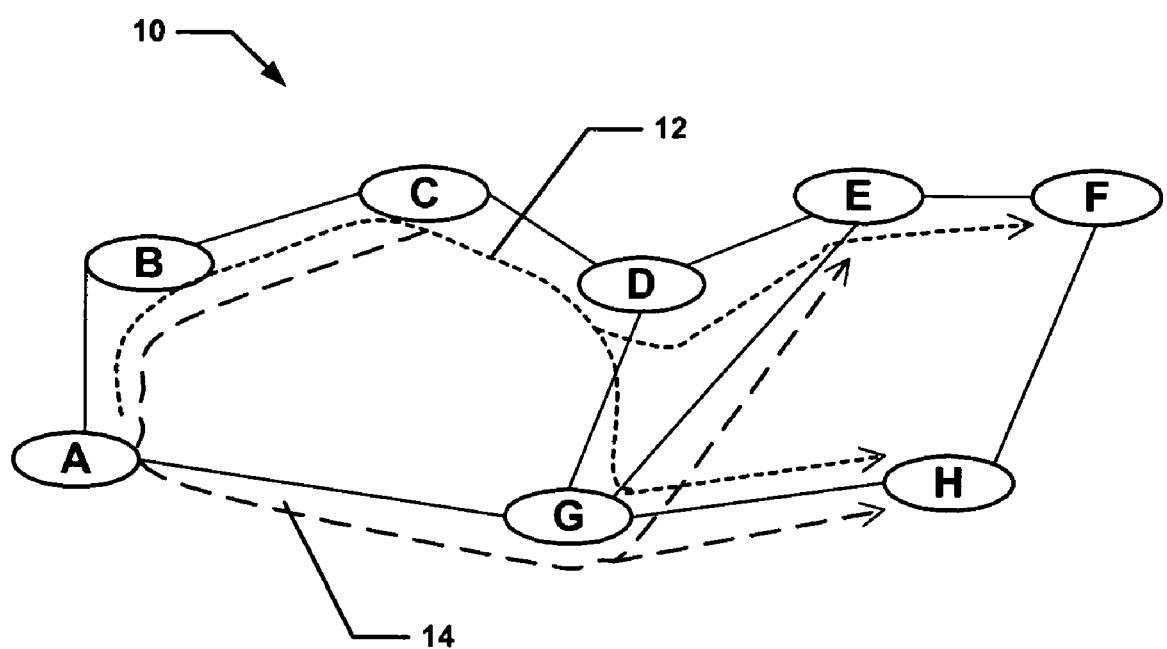
FIG. 1 comprises a diagram of a network showing a first backup path for a primary tunnel.

In describing the present method and apparatus for determining a preferred backup tunnel to protect point-to-multipoint label switch paths, a network comprising an arbitrary set of nodes is used. In this network only a subset of the nodes are capable of branching (traffic replication). The network requires the use of Fast Reroute so as to protect fast reroutable P2MP TE LSP from the failure of a branching node. The objective is to dynamically determine the PLR location taking into account the "branching node" capability, required backup capacity for the backup tunnel and the failure detection bound.

A first aspect of the method and apparatus for determining a preferred backup tunnel to protect point-to-multipoint label switch paths involves specifying a new Intermediate System to Intermediate System (ISIS) and Open Shortest Path First (OSPF) Type Length Value (TLV) carried within the ISIS Router capability TLV and Routing Information Link State Advertisement (LSA) respectively in order for a protected node (a branching node, named PN) to dynamically request the computation of backup tunnels to protect the P2MP primary traversing this node from its own failure. Such request may be sent by means of Interior Gateway Protocol (IGP) extensions if at least one P2MP TE LSP traverses the node.

A second aspect of this invention specifies a distributed technique so as to elect the PLR that offers the more optimum (preferred) backup tunnel with a constraint on the failure detection time. The bounded maximum failure detection time is noted MFD and is signaled by the head-end LSR using a new TLV carried within the LSP-ATTRIBUTE object of an RSVP Path message.

Each upstream node Ni of PN along the path of the fast reroutable P2MP LSP triggers the following set of actions. First, computation of the preferred backup tree protecting against a failure of PN is determined. The preferred backup tree refers to the backup tunnel tree with minimum cost (various heuristics are used to compute an near optimal Steiner tree). If the PLR is not a branching capable node the cost of such tree must include the cost from the PLR to the backup branching node.

Ci is denoted as the cost of such backup tunnel. It must be noted that local policy may be configured so as to select a set of P2P backup tunnels instead of a P2MP backup tunnel if the resulting number of states exceeds some configurable threshold and the node Ni is branching capable. By contrast with the protection of P2P Fast Reroutable LSPs, each PLR must compute a P2MP backup tunnel that exactly intersects the P2MP primary tunnel; this may require more backup tunnels. The cost Ci also takes into account the PLR location with respect to the head-end LSR of the protected P2MP TE LSP.

The failure detection time FDi from Ni to PN is then evaluated and compared to MFD. FDi can be computed using the TE or IGP metric (e.g. metric representing the link propagation delay). If FDi<MFD then the node Ni then records its Router-ID, protected node ID (PN ID) and optimum backup tunnel cost Ci in a newly defined TLV carried within the LSP-ATTRIBUTE in the Resv message of the protected P2MP primary LSP.

The same procedure is repeated at each node so as to determine the elected PLR. Such PLR ID is then piggybacked in the RSVP Path message of the fast reroutable P2MP TE LSP. Where several upstream Ni nodes have the same Ci, the PLR closest to PN is preferred.

Figure 2:
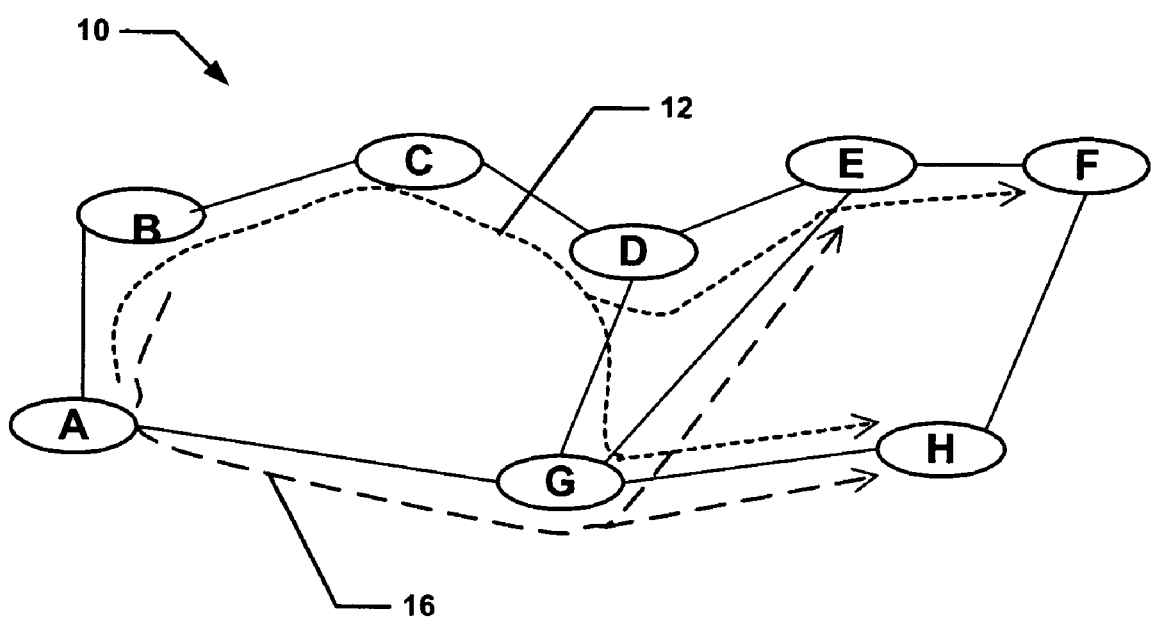
FIG. 2 comprises a diagram of a network showing a second backup path for a primary tunnel.
Figure 3:
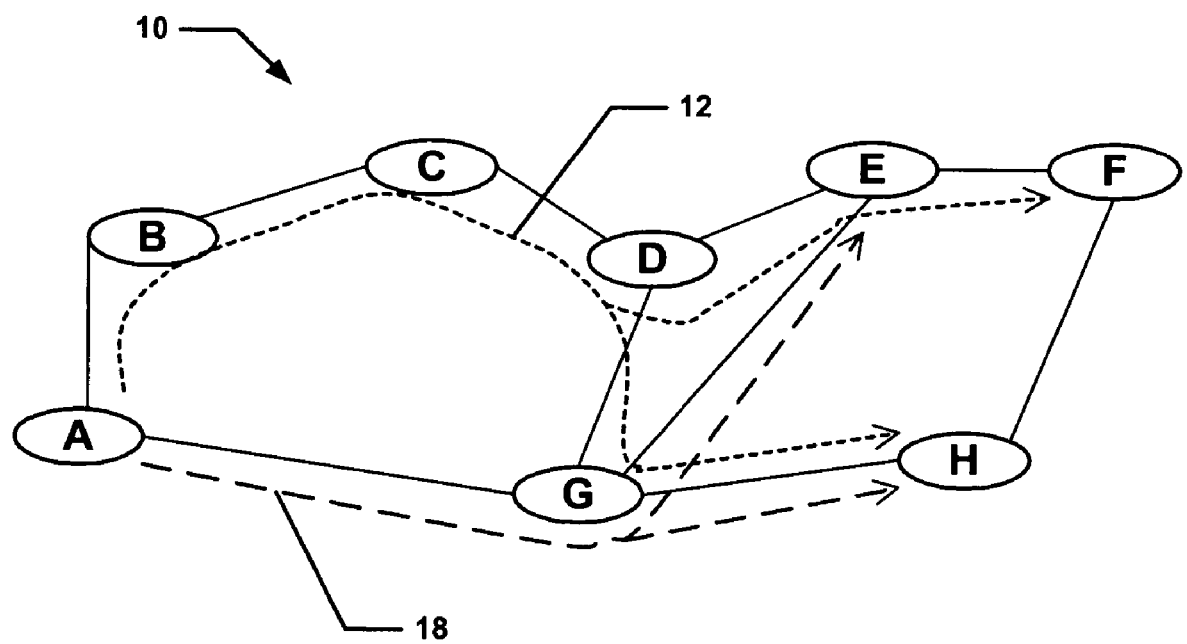
FIG. 3 comprises a diagram of a network showing a third backup path for a primary tunnel.

A particular example is shown in FIGS. 1-3. Referring now to FIG. 1, a network environment 10 is shown. The network includes a plurality of nodes A-H. Node D is a branching node. The primary tunnel 12 for the network is shown as a dotted line. This primary tunnel 12 traverses from node A, to node B, to node C and to node D. Node D is a branching node and can forward packets to node E and to node G (D acts as a branching node, thus replicating the traffic). Node E forwards packets to node F, and node G forwards packets to Node H. It is desirable to establish a backup tunnel for branching node D, also referred to as a protected node. The backup tunnel is determined before an error occurs, such that in the event of an error, reroute can occur in a timely fashion.

A point-to-multipoint backup path for each node located upstream from a branching the node is determined the backup path originating at the node and including each node downstream from said branching node. Thus, in this example a P2MP backup path will be determined for each of nodes A, B and C. In FIG. 1 the backup path 14 is computed from Node C and traverses from node C, to node B, to node A to Node G, then from node G to node E and from node G to node H. A cost metric associated with the backup path is determined, the cost metric including a time to perform fast restoration and a time for the originating node (node C) of the backup path to receive notification of an error of the branching node (node D). A distance metric associated with the backup path 14 is also determined, the distance metric including a cost of the backup path from the Point of Local Repair (PLR) (node C).

Referring now to FIG. 2 a backup path 16 is computed from Node B and traverses from node B to node A, to Node G, then from node G to node E and from node G to node H. A cost metric associated with this backup path 16 is determined, the cost metric including a time to perform fast restoration and a time for the originating node (node B) of the backup path to receive notification of an error of the branching node (node D). A distance metric associated with the backup path 16 is also determined, the distance metric including a cost of the backup path from the PLR (node B).

Referring now to FIG. 3 a backup path 18 is computed from Node A and traverses from node A to node G, then from node G to node E and from node G to node H. A cost metric associated with this backup path 18 is determined, the cost metric including a time to perform fast restoration and a time for the originating node (node A) of the backup path to receive notification of an error of the branching node (node D). A distance metric associated with the backup path 18 is also determined, the distance metric including a cost of the backup path from the PLR (node A).

Having a set of backup paths 14, 16 and 18, each with an associated cost metric and distance metric, a determination is made regarding a preferred backup path from the collection of backup paths based on the cost metric and the distance metric associated with each path.

In this embodiment, backup path 14 is close to the protected node D, but the actual backup path is long. Backup path 16 is not too far away from node D, and the backup path is not too long. Backup path 18 has a short backup path length, however, node A is located far away from Node D, thus would take to long for the fast reroute to happen, resulting in too large a number of dropped packets. Thus, backup path 16 is selected as the preferred backup path in case of a failure of branching node D. In the event of a failure of node D, node B would be notified and the backup path for node D would be implemented.

In certain embodiments, there may be several nodes located upstream from a branching node which could act as the head point (PLR: Point of Local Repair) of a backup tunnel, however, only nodes which meet a predetermined criteria would compute backup paths, and not every node upstream from the branching node being protected. The predetermined criteria may involve a distance from the protected branching node, either a physical distance or a number of hops. While the example provided only used a minimal number of nodes and backup paths, it should be understood that any number of nodes and backup paths could be utilized.

Figure 4:
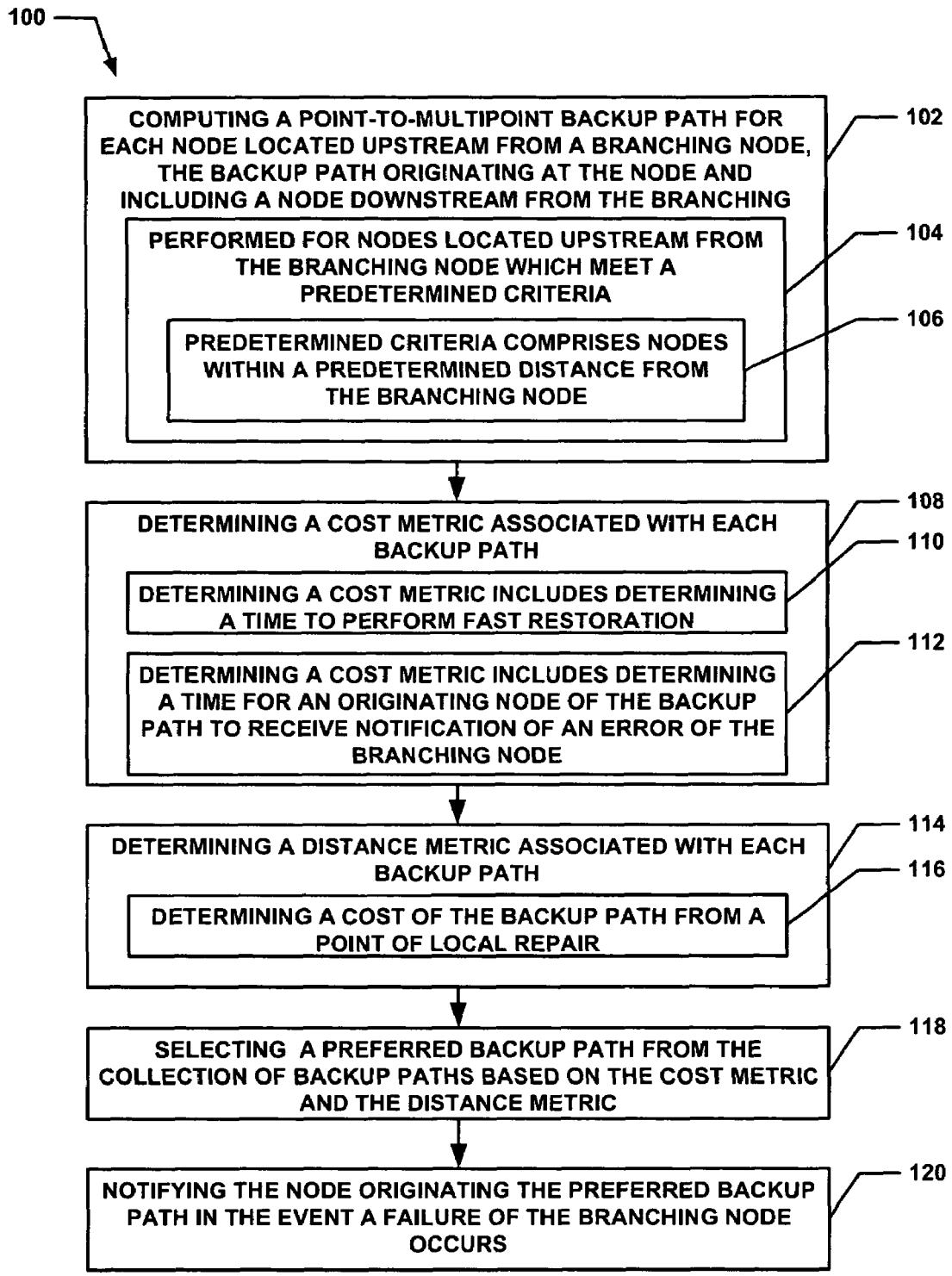
FIG. 4 depicts a flow diagram for a particular embodiment of a method for determining a preferred backup path to protect a point-to-multipoint label switching path in accordance with embodiments of the invention.
Figure 5:
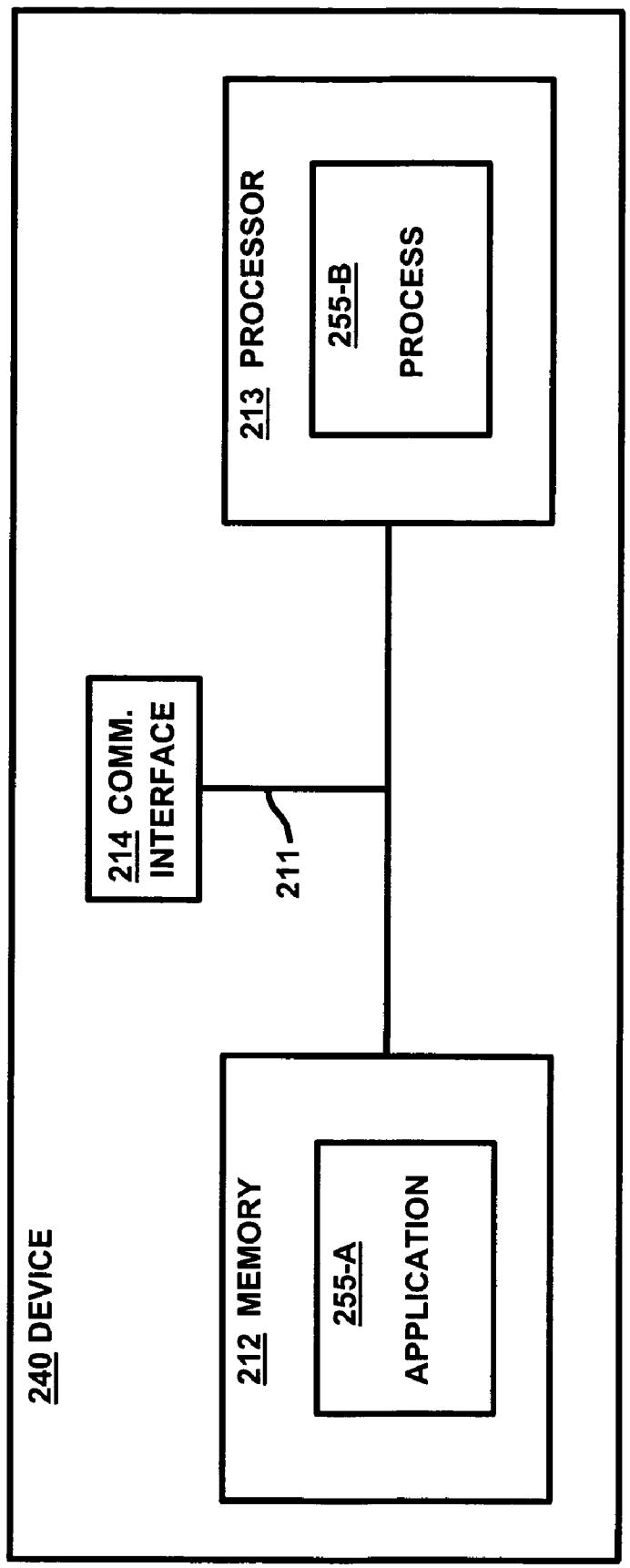
FIG. 5 illustrates an example computer system architecture for a computer system that determines a preferred backup path to protect a point-to-multipoint label switching path in accordance with embodiments of the invention.

A flow chart of the presently disclosed method is depicted in FIG. 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a flow diagram for a method of determining a preferred backup path to protect a point-to-multipoint label switching path is shown. The method begins with processing block 102 which discloses computing a point-to-multipoint backup path for each node located upstream from a branching node, the backup path originating at the node and including a set of nodes downstream from the branching node. In certain scenarios, as recited by processing block 104 the computing a backup path is only performed for nodes located upstream from the branching node which meet a predetermined criteria. As further stated in processing block 106, the predetermined criteria comprises nodes within a predetermined distance from the branching node. This is done to minimize the amount of backup path computations that need to be performed.

Processing continues at processing block 108 which discloses determining a cost metric associated with each backup path. As recited in processing block 110, this may include determining a time to perform fast restoration. As further recited in processing block 112 determining a cost metric may also include determining a time for an originating node of the backup path to receive notification of an error of the branching node.

Processing block 114 recites determining a distance metric associated with each backup path. Processing block 116 discloses that determining a distance metric comprises determining a cost of the backup path from the PLR. The length could be a physical distance, a number of hops or similar type measurement.

Processing block 118 states selecting a preferred backup path from the collection of backup paths based on the cost metric and the distance metric. Once the preferred backup path has been determined, as shown in processing block 120, the node originating the preferred backup path is notified in the event a failure of the branching node occurs. In such a manner a preferred backup path for a branching node is determined and will be utilized in the event of a failure of the branching node.

Another embodiment comprises a computer readable medium having computer readable code thereon for determining a preferred backup path to protect a point-to-multipoint label switching path. The medium includes instructions for computing a point-to-multipoint backup path for each node located upstream from a branching node, the backup path originating at the node and including a node downstream from the branching node. In certain scenarios the medium further includes instructions such that the computing a backup path is only performed for nodes located upstream from the branching node which meet a predetermined criteria. The predetermined criteria comprises nodes within a predetermined distance from the branching node. The length could be a physical distance, a number of hops or similar type measurement.

The medium also includes instructions for determining a cost metric associated with each backup path. This may include instructions for determining a time to perform fast restoration. This may further include instructions for determining a time for an originating node of the backup path to receive notification of an error of the branching node.

The medium additionally includes instructions for determining a distance metric associated with each backup path. The instructions for determining a distance metric comprises instructions for determining a cost of the backup path from the PLR.

The medium further includes instructions for selecting a preferred backup path from the collection of backup paths based on the cost metric and the distance metric. Once the preferred backup path has been determined, the node originating the preferred backup path is notified in the event a failure of the branching node occurs.

FIG. 6 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

What is claimed is:

1. A method comprising:
    providing a point-to-multipoint label switching path having a plurality of nodes interconnected by network links, wherein at least one of the plurality of nodes is a branching node;
    computing, with a processor, a point-to-multipoint backup path to the point-to-multipoint label switch path for each of a plurality of nodes located upstream from said branching node each backup path originating at a respective node located upstream from said branching node and including a set of nodes located downstream from said branching node, wherein at least one of said backup paths includes at least one network link present in the point-to-multipoint label switching path;
    determining a cost metric associated with each backup path;
    determining a distance metric associated with each backup path; and
    selecting one of the backup paths as said preferred backup path based on said cost metric and said distance metric.

2. The method of claim 1 further comprising notifying the node originating said preferred backup path in the event a failure of the branching node occurs.

3. The method of claim 1 wherein said determining a cost metric includes determining a time to perform fast restoration.

4. The method of claim 3 wherein said determining a cost metric includes determining a time for an originating node of each backup path to receive notification of an error of the branching node.

5. The method of claim 1 wherein said determining a distance metric comprises determining a cost of each backup path from a Point of Local Repair.

6. The method of claim 1 wherein said computing a backup path is only performed for nodes located upstream from said branching node which meet a predetermined criteria.

7. The method of claim 6 wherein said predetermined criteria comprises nodes within a predetermined distance from said branching node.

8. The method of claim 7 wherein said predetermined distance is selected from the group comprising a physical distance and a number of hops.

9. A tangible computer readable medium having computer readable instructions executable by a processor stored thereon, the tangible computer readable medium comprising:
   instructions to determine a point-to-multipoint label switching path having a plurality of nodes interconnected by network links, wherein at least one of the plurality of nodes is a branching node;
   instructions for computing a point-to-multipoint backup path to the point-to-multipoint label switching path for each of a plurality of nodes located upstream from said branching node, each backup path originating at a respective node located upstream from said branching node and including at least one node located downstream from said branching node, wherein at least one of said backup paths includes at least one network link of the point-to-multipoint label switching path;
   instructions for determining a cost metric associated with each backup path;
   instructions for determining a distance metric associated with each backup path; and
   instructions for selecting one of the backup paths as said preferred backup path based on said cost metric and said distance metric.

10. The tangible computer readable medium of claim 9 further comprising instructions for notifying the node originating said preferred backup path in the event of failure of said branching node occurs.

11. The tangible computer readable medium of claim 9 wherein said instructions for determining a cost metric includes instructions for determining a time to perform fast restoration.

12. The tangible computer readable medium of claim 11 wherein said instructions for determining a cost metric includes instructions for determining a time for an originating node of each backup path to receive notification of an error of said branching node.

13. The tangible computer readable medium of claim 9 wherein said instructions for determining a distance metric comprises instructions for determining a cost of each backup path from a Point of Local Repair.

14. The tangible computer readable medium of claim 9 wherein said instructions for computing a backup path is only performed for nodes located upstream from said branching node which meet a predetermined criteria.

15. The tangible computer readable medium of claim 14 wherein said predetermined criteria comprises nodes within a predetermined distance from said branching node.

16. The tangible computer readable medium of claim 15 wherein said predetermined distance is selected from the group comprising a physical distance and a number of hops.

17. A computer system comprising:
   a memory;
   a processor;
   a communications interface;
   an interconnection mechanism coupling the memory, the processor and the communications interface; and
   wherein the memory is encoded with an application that when performed on the processor, the process causing the computer system to perform the operations of:
   determining a point-to-multipoint label switching path having a plurality of nodes interconnected by network links, wherein at least one of the plurality of nodes is a branching node;
   computing a point-to-multipoint backup path to the point-to-multipoint label switching path for each of a plurality of nodes located upstream of said branching node, each backup path originating at a respective node located upstream of the branching node and including at least one node located downstream from said branching node, wherein at least one of the backup paths includes at least one link of the point-to-multipoint label switching path;
   determining a cost metric associated with the backup path;
   determining a distance metric associated with the backup path; and
   selecting one of the backup paths from as the preferred backup path based on the cost metric and the distance metric.

18. The computer system of claim 17 wherein said determining a cost metric includes determining a time to perform fast restoration.

19. The computer system of claim 18 wherein said determining a cost metric includes determining a time for said node to receive notification of an error of said branching node.

20. The computer system of claim 17 wherein said determining a distance metric comprises determining a cost of each backup path from a Point of Local Repair.

* * * * *